US00RE33844E

United States Patent [19]

Koizumi et al.

[11] E Patent Number: Re. 33,844

[45] Reissued Date of Patent: Mar. 10, 1992

[54] TRANSFER MEDIUM SEPARATION IN A RECORDING APPARATUS

[75] Inventors: Yutaka Koizumi, Yokohama; Eiichi Akutsu, Ebina, both of Japan

[73] Assignee: Ricoh Company, Ltd., Tokyo, Japan

[21] Appl. No.: 267,709

[22] Filed: Nov. 3, 1988

Related U.S. Patent Documents

Reissue of:

[64] Patent No.: 4,571,057
Issued: Feb. 18, 1986
Appl. No.: 493,007
Filed: May 9, 1983

U.S. Applications:

[63] Continuation of Ser. No. 938,437, Dec. 5, 1986, abandoned.

[30] Foreign Application Priority Data

May 12, 1982 [JP] Japan ..... 57-79627

[51] Int. Cl.[5] ..... G03G 15/00; G03G 15/14; B65H 29/56

[52] U.S. Cl. ..... 355/271; 355/311; 355/315; 271/307; 271/900

[58] Field of Search ..... 355/1, 3 R, 3 DR, 3 TE, 355/3 TR, 3 SH, 3 CH; 271/900, 307; 361/214, 220

[56] References Cited

U.S. PATENT DOCUMENTS

| | | | |
|---|---|---|---|
| 3,508,824 | 4/1970 | Leinbach et al. | 355/3 R |
| 3,850,519 | 11/1974 | Weikel, Jr. | 355/3 TR |
| 3,984,183 | 10/1976 | Maksymiak | 355/3 R X |
| 3,997,262 | 12/1976 | Doi et al. | 355/3 R X |
| 4,126,388 | 11/1978 | Kawai | 355/1 |
| 4,363,550 | 12/1982 | Toshimitsu et al. | 355/3 TR |
| 4,378,154 | 3/1983 | Hoffman | 355/3 R |
| 4,500,195 | 2/1985 | Hosono | 355/3 R |

FOREIGN PATENT DOCUMENTS

| | | | |
|---|---|---|---|
| 3004291 | 8/1981 | Fed. Rep. of Germany | 355/1 |
| 56-46274 | 4/1981 | Japan | 355/3 TE |
| 1523633 | 9/1978 | United Kingdom | 271/307 |
| 2091640 | 8/1982 | United Kingdom | 355/3 DR |

OTHER PUBLICATIONS

*IBM Technical Disclosure Bulletin;* vol. 18, No. 7, Dec. 1975 Colglazier et al., "Variable Size Exit Tray", pp. 2059-2060.

*Electrophotography,* Schaffert, R. M., The Focas Press, New York, 1975, p. 167.

*Primary Examiner*—Joan H. Pendegrass
*Attorney, Agent, or Firm*—Oblon, Spivak, McClelland, Maier & Neustadt

[57] ABSTRACT

A recording apparatus includes an image bearing or forming drum which is driven to rotate in a predetermined direction at constant speed. As the drum rotates, an image is formed on its peripheral surface electrostatically or electrophotographically. The image, developed or undeveloped, on the drum is then transferred to a transfer medium with the stiffness of the transfer medium being adjusted prior to the transfer. The drum has a diameter which is small enough for the transfer medium to be separated away from the drum by its own stiffness after image transfer, thereby allowing to dispose of an extra separating device and to make the whole apparatus compact in size and simple in structure.

20 Claims, 3 Drawing Sheets

TRANSFER MEDIUM SEPARATION IN A RECORDING APPARATUS

Matter enclosed in heavy brackets [ ] appears in the original patent but forms no part of this reissue specification; matter printed in italics indicates the additions made by reissue.

*This application is a continuation of application Ser. No. 938,437, filed on Dec. 5, 1986, now abandoned.*

BACKGROUND OF THE INVENTION

1. Field of the Invention

The present invention generally relates to a recording apparatus, and, in particular, to a recording apparatus of the type including a drum-shaped image forming member.

2. Description of the Prior Art

A recording apparatus including a drum-shaped image forming member whose peripheral surface is defined as an image forming surface is well known in the art of electrophotography. In such a recording apparatus, a drum-shaped image forming member is driven to rotate at constant speed, and, as the drum rotates, an electrostatic latent image is formed on the peripheral surface of the drum. Then, the thus formed latent image may be developed to form a visible image which is then transferred to a recording medium such as recording paper. Alternatively, the latent image formed on the peripheral surface of the drum may be transferred to a recording medium, which is then developed to obtain a visible image on the recording medium. Such an image forming member may be either photoconductive or electrically insulating in nature. In the former case, an electrostatic latent image is formed on the image forming member by first uniformly charging the image forming member and then exposing the thus charged image forming member to a light image. On the other hand, in the latter case, use is usually made of a multistylus recording unit for forming an electrostatic latent image on the image forming member with or without prior uniform charging. The image forming member is typically constructed in the form of a drum because it allows to apply various electrophotographic process steps sequentially in repetition with ease.

In such a recording apparatus, a recording medium, typically paper, must be brought into contact with the surface of the drum-shaped image forming member in order to transfer either an electrostatic latent image or a developed image from the image forming member to the recording medium. After transfer, the recording medium must then be peeled off the image forming member. However, when the recording medium is brought into contact with the image forming member, the recording medium strongly adheres to the image forming member due to electrostatic attractive forces, so that provision is usually made of a separating device for positively causing the recording medium to be separated from the image forming member after image transfer. It is often observed that incomplete separation takes place even if such a separating device is provided. Such incomplete separation would cause the recording medium to be stuck to the image forming drum, which is disadvantagous because removing operation of the thus stuck recording medium from the drum is extremely cumbersome. If a user tries to remove the stuck recording medium, a damage could be imparted to the image forming member, necessitating the replacement of image forming members, which is rather costly.

SUMMARY OF THE INVENTION

The above-described disadvantages of the prior art are overcome with the present invention and an improved recording apparatus is hereby provided. In accordance with the present invention, there is provided a recording apparatus which includes a drum-shaped image forming member whose diameter is suitably determined so as to allow a recording medium, typically paper, to be separated from the drum-shaped image forming member by itself after image transfer as the drum-shaped image forming member rotates. The present invention also provides a recording medium transport structure which aids a recording medium to tend to separate away from the image forming member after image transfer.

Therefore, it is a primary object of the present invention to provide an improved recording apparatus.

Another object of the present invention is to provide an image transfer type recording apparatus capable of having a recording medium separated from a drum-shaped image forming member by itself after image transfer as the drum-shaped image forming member rotates.

A further object of the present invention is to provide an electrophotographic recording apparatus which may be constructed compact in size and fast in operation.

A still further object of the present invention is to provide an electrophotographic reproduction apparatus which is extremely easy in maintenance.

Other objects, advantages and novel features of the present invention will become apparent from the following detailed description of the invention when considered in conjunction with the accompanying drawings.

DESCRIPTION OF THE PREFERRED EMBODIMENTS

Figure 1:
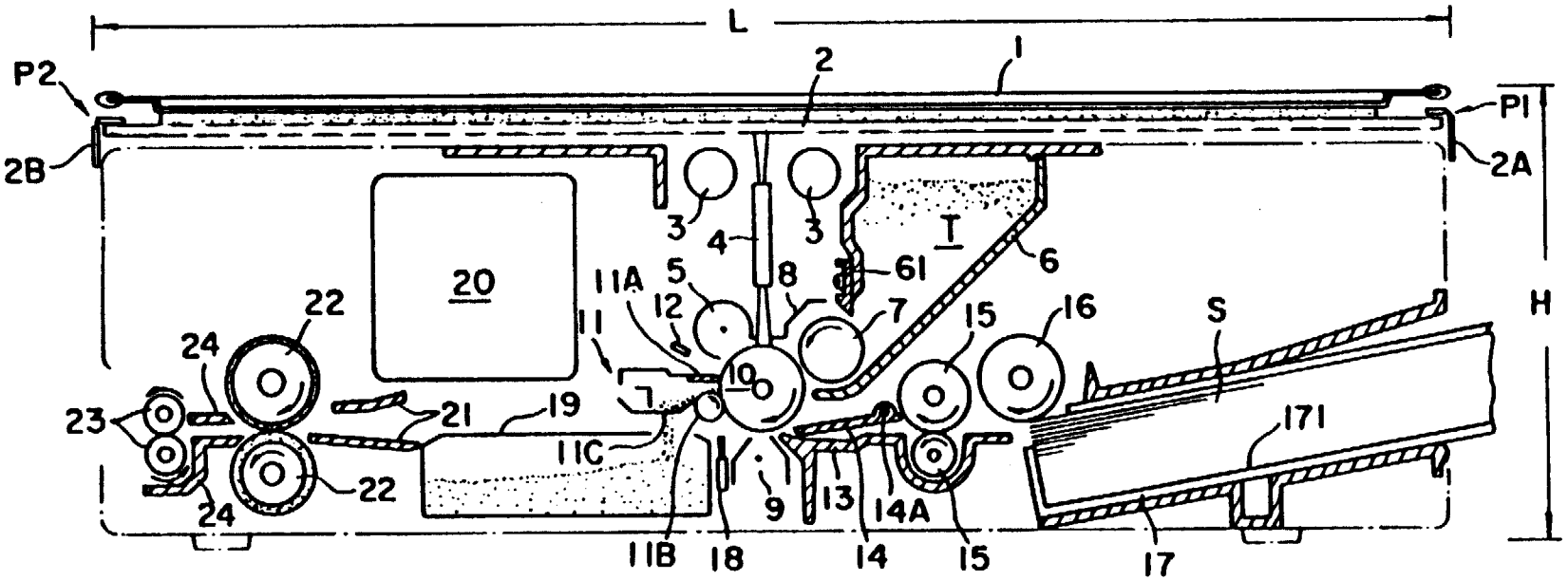
FIG. 1 is a schematic illustration showing a recording apparatus constructed in accordance with one embodiment of the present invention.

In accordance with one feature of the present invention, there is provided a recording apparatus which includes an image forming drum whose peripheral surface is defined as an image forming surface on which an electrostatic latent image is formed and whose diameter is determined to be as small as practically possible so as to allow a recording medium to be separated away from the drum by itself after image transfer from the drum to the recording medium as the drum rotates. The diameter of the drum is preferably set in the range from 10 mm to 40 mm. With such an image forming drum having a relatively small diameter or a large curvature, the recording medium may be separated away from the image forming drum as it is transported in association with the rotation of the drum after having been brought into contact with the drum for transferring an image, latent or developed, from the drum to the recording medium.

A recording *or transfer* medium, in particular cut paper or a sheet of paper, has a certain degree of stiffness or elasticity so that when it is forced to roll up into a cylinder having a small diameter or large curvature, it exhibits a relatively strong counter force. Accordingly, if a drum-shaped image forming member is so structured to have a relatively small diameter, a recording medium will encounter a relatively strong resistant force when it is forced to be placed around the drum-shaped image forming member. Thus, by making an image forming drum as small as practically possible, preferably in a predetermined range, it is possible to cause the recording medium to separate away from the drum by its own stiffness or elasticity as the drum rotates after having been brought into contact with the drum for image transfer. Such a structure is quite advantageous because there is no need to provide an extra separating device and yet the recording medium may be separated securely at all times.

From the view point of separation of a recording medium from an image forming drum, it is preferable to make the drum as small in diameter as possible or as large in curvature as possible. However, in a recording apparatus of the above-described type, there is a practical limit in making the diameter of the image forming drum smaller. Stated more in detail, in order to carry out process steps such as charging and image exposure, various process units must be disposed around the image forming drum. These process units include a charging device, an optical system for image exposure, or other electrostatic latent image forming means such as a multistylus recording head, an image transfer device, etc. Accordingly, the diameter of the drum cannot be made smaller than 10 mm because it becomes impossible to dispose these process units around the drum. Moreover, in the case of a photoconductive image forming drum, if the curvature of the peripheral surface of the drum becomes too large, a larger discrepancy in optical length will be created between an original surface and the peripheral surface of the drum at an image exposure position, which thus prohibits to carry out proper image exposure operation. In this manner, there is a limit in making the diameter of the image forming drum smaller as imposed by the overall structural constraints and other conditions such as an image exposing condition, if any. On the other hand, if the diameter of the image forming drum is made larger thereby providing a smaller curvature at the peripheral surface, there will be less tendency for the recording medium to separate away from the drum.

Based on a simple model, the condition for a recording medium to separate away from the image forming drum by its own elasticity will be derived in the following.

Considering only an electrostatic force as an external force acting on a recording medium, and denoting the moment due to such an electrostatic force with respect to the point of separation by Mq and the moment due to stiffness or rigidity (elasticity) of the recording medium with respect to the point of separation by Ms, the following condition must be met in order for the recording medium to separate away from the image forming drum by its own stiffness.

$$Ms \geqq Mq$$

Furthermore, the distance between the point of separation and the leading end of the recording medium is denoted by 1 and the thickness of a photoconductive layer or an electrically insulating layer in the drum-shaped image forming member is denoted by d. Assuming that the recording medium electrostatically adheres to the drum over the distance from its leading edge to the point of separation, the electrostatic attractive force acting between the recording medium and the drum is a mirror image force between the charge applied to the recording medium and the charge induced by the charge on the recording medium in the electrically conductive portion of the drum.

In the case where the total amount Q of the charge is distributed over that portion of the recording medium which is in contact with the image forming drum, it is assumed as an approximation that the charge Q is concentrated at the center of that portion of the recording medium contacting the drum. Under the condition, the moment Mq may be derived as follows:

$$Mq = (Q^2/4\pi\epsilon_0(2d)^2)\cdot(\tfrac{1}{2}) \quad (1)$$

where, $\epsilon_0$ is a dielectric constant in vacuum.

With the electrostatic capacitance of the recording medium denoted by $C_p$ and the potential by $V_p$, the above equation (1) may be modified as follows:

$$Mq = ((C_pV_p)^2/16\pi\epsilon_0 d^2)\cdot(\tfrac{1}{2}) \quad (2)$$

On the other hand, with E indicating Young's modulus, Iz moment of inertia of a cross section and R radius of curvature, the stiffness moment Ms of the recording medium may be expressed as follows:

$$Ms = E\cdot Iz/R \quad (3)$$

As an example, if the recording medium is a sheet of paper of fine quality, which is commonly used in a visual image transfer type recording apparatus, the value of $C_p$ is equal to 20 pF/cm$^3$. And, in the case where the image forming member is a photosensitive member including Se, $d = 1\times10^{-3}$ cm. Thus, with $1 = 1$ cm, $V_p = 300$ and $E\cdot Iz = 1.5\times10^{-1}$ N·cm$^2$, the radius of curvature R which satisfies the condition of Ms being equal to or larger than Mq may be expressed in the following manner.

$$R \leqq (32\pi\epsilon_0 d^2 EIz)/((C_pV_p)^2 L) \cong 3.6 \text{ cm} \quad (4)$$

Therefore, it is obvious that as long as the diameter of the drum-shaped image forming member is 72 mm or smaller, the recording medium may be automatically peeled off the image forming drum under the above conditions.

With the above result as a rule of thumb, several image forming drums having diameters 80 mm, 60 mm, 40 mm and 25 mm have been constructed, and tests have been conducted using various kinds of recording mediums to check as to automatic separating performance by their own stiffness. The results of such tests are tabulated in the following table I.

TABLE I

| Drum Dia. | 80 mm 30° C. 90% RH | 80 mm 20° C. 60% RH | 80 mm 10° C. 30% RH | 60 mm 30° C. 90% RH | 60 mm 20° C. 60% RH | 60 mm 10° C. 30% RH | 40 mm 30° C. 90% RH | 40 mm 20° C. 60% RH | 40 mm 10° C. 30% RH | 25 mm 30° C. 90% RH | 25 mm 20° C. 60% RH | 25 mm 10° C. 30% RH |
|---|---|---|---|---|---|---|---|---|---|---|---|---|
| Transfer Paper (65 kg/unit) | 0.8 | 0.5 | 0.9 | 0.1 | 0.0 | 0.0 | 0.0 | 0.0 | 0.0 | 0.0 | 0.0 | 0.0 |
| Transfer Paper (45 kg/unit) | 1.2 | 1.1 | 1.5 | 0.0 | 0.0 | 0.3 | 0.0 | 0.0 | 0.0 | 0.0 | 0.0 | 0.0 |
| Plain Paper | 4.7 | 1.3 | 2.1 | 0.3 | 0.5 | 0.9 | 0.1 | 0.0 | 0.1 | 0.0 | 0.0 | 0.0 |
| Tracing Paper (thick) | 1.3 | 0.8 | 0.9 | 0.0 | 0.2 | 0.4 | 0.0 | 0.0 | 0.0 | 0.0 | 0.0 | 0.0 |
| Tracing Paper (thin) | 7.9 | 3.5 | 6.2 | 0.2 | 0.7 | 0.2 | 0.0 | 0.0 | 0.1 | 0.0 | 0.0 | 0.0 |
| Roll Paper (36 kg/unit) | 13.6 | 9.8 | 15.1 | 0.6 | 1.1 | 1.2 | 0.0 | 0.0 | 0.2 | 0.0 | 0.0 | 0.1 |

In the above tests, use has been made of a Se photosensitive member as a drum-shaped image forming member. The recording mediums used were all in A4 size, the voltage applied to the corona transfer unit was 6.0 kV with the transporting speed of a recording medium at 110 mm/sec. The numbers shown in the table indicate the rates of occurrence of incomplete separation in terms of percentage, and, thus, the number "0.3" indicates that incomplete separation occurred three times out of 1,000 trials. As is obvious from the above table, as long as the diameter of the image forming drum is set at 40 mm or smaller, automatic separation due to stiffness of recording paper itself results. In this manner, the upper limit of a preferred range of the diameter of image forming drum has been determined experimentally.

In accordance with the present invention, since separation of a recording medium from a drum-shaped image forming member takes place automatically as well as securely utilizing the stiffness or elasticity of the recording medium itself, it is not necessary to provide a separating device which is exclusively used for separating the recording medium from the drum, thereby allowing to bring about numerous advantages such as compactization or simplification of the entire apparatus, preventing a recording medium from being stuck around an image forming drum, light weight and a reduction in cost.

Referring now to FIG. 1, there is shown a recording apparatus constructed in accordance with the present invention. As shown, the present recording apparatus includes a pressure plate 1 to be placed on an original for keeping the original in position during operation and a contact glass plate 2 on which the original is to be placed. Moreover, the apparatus includes such elements as illumination lamps 3, an image exposing optical system 4, a corona charging unit 5, a hopper 6 for containing therein a quantity of toner particles, a developing roller 7 *positioned for applying a toner to the image forming member and having a diameter smaller than that of the image forming member*, a transfer corona unit 9, a photosensitive drum 10 as a drum-shaped image forming member, a cleaning unit 11, a quenching lamp 12, a transfer paper guide structure 13, a pressure plate 14, a registration roller 15, a paper feed roller 16, a cassette 17 for storing therein a quantity of sheets of transfer paper, a discharging brush 18 for removing charges from a sheet of transfer paper, a toner collecting container 19, a main motor 20, guide plates 21, an image fixing unit 22, paper discharging rollers 23 for discharging a sheet of transfer paper to the exterior of the apparatus and further guide plates 24. The contour of the apparatus is indicated by the one dotted line.

As regards the size of the present apparatus, its length extending from right to left in FIG. 1 is 390 mm, its height is 125 mm and its width extending normal to the plane of the drawing is 390 mm; and, it weighs not more than 30 kg. It is to be noted that an original of up to B4 size may be reproduced in the present apparatus.

The contact glass plate 2 may move to the right or left together with the pressure plate 1 with respect to the main body of the present recording apparatus shown in FIG. 1. The pressure plate 1 is hinged to a frame of the contact glass plate 2 so that it may be pivotally moved with respect to the contact glass plate 2. Light shield plates 2A and 2B are pivotally mounted at pivot axes P1 and P2, respectively, on both sides of the contact glass plate 2. These shield plates 2A, 2B are comprised of a light shielding material and they extend across the full width of the contact glass plate 2.

The illumination lamps 3, 3 extend in the widthwise. direction of the apparatus, and, when lit, they illuminate that portion of an original (not shown) placed on the contact glass plate 2 which is located immediately above the image exposing optical system 4, which may, for example, be comprised of an array of convergent light transmitting mediums. The hopper 6 is disposed to the right of the optical system 4 and it contains therein a quantity of toner particles T. At the supply mouth of the hopper 6 is disposed a doctor 61 for regulating the amount of toner particles to be supplied from the hopper 6. The toner particles T are preferably comprised of the so-called one component magnetic toner particles having a relatively high resistivity, e.g., $10^{14}$ ohms-cm or more. Also disposed at the mouth of the hopper 6 is the developing roller 7 comprising a sleeve which is driven to rotate in the direction indicated by the arrow and a plurality of stationary magnets disposed inside of the sleeve. As the sleeve rotates, the toner particles T contained in the hopper 6 are partly carried as magnetically attracted to the peripheral surface of the sleeve to the developing station which is defined at the location where the sleeve is opposed to the photosensitive drum 10. As previously mentioned, the thickness of a layer of the toner particles formed on the peripheral surface of the roller 7 or its sleeve is regulated by the doctor blade 61.

The cover plate 8 is disposed above the developing roller 7 to prevent the toner particles from being scattered. On the other hand, the cover plate 8, together with the shield plate of the corona charging unit 5, defines an exposure slit. The cleaning device 11 is primarily comprised of a blade 11A, a shield roller 11B and a transportation tray 11C. Any toner particles remaining on the peripheral surface of the drum 10 are removed by the blade 11A and thus fallen on the shield roller 11B. The counterclockwise rotation of the shield roller 11B causes the thus fallen toner particles to be transported to the tray 11C. Although not shown specifically, the tray 11C is kept in biased oscillation in the direction normal to the plane of the drawings by means of an oscillating mechanism (not shown). Because of a difference in acceleration in the going and returning strokes of oscillation, the toner particles riding on the tray 11C gradually move to a predetermined direction, e.g., toward the viewer of FIG. 1. The toner particles thus moved along the tray 11C are then dropped over the far end of the tray 11C into the toner collection container 19.

The quenching lamp 12 is comprised of an array of light emitting diodes which emit light toward the drum 10 to remove residual charges thereon thereby causing the surface potential of the drum 10 at a predetermined level. The photosensitive drum 10 has a diameter of 25 mm and it includes a photoconductive layer comprised of Se. Such a small-sized photosensitive drum is higher in frequency of usage as compared with those having larger diameters. Thus, the surface of the drum 10 is preferred to be of high wear-resistance. Accordingly, a material of Se family or As-Se family is preferably used.

The cassette 17 is so structured to be detachably mountable in the apparatus, as shown, and it stores a quantity of cut sheets of transfer paper S as recording mediums. A number of sheets of transfer paper S are placed on a bottom plate 171 in the form of a stack. Since the bottom plate 171 is normally biased upwardly, for example, by a spring, the topmost sheet of transfer paper is always pressed against the paper feed roller 16.

Figure 2:
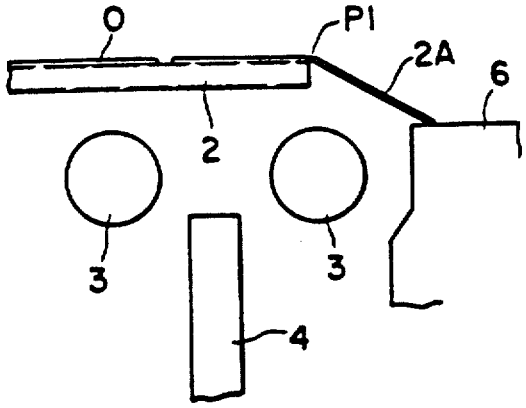
FIGS. 2 and 3 are schematic illustrations which are useful for explaining the operation of the recording apparatus shown in FIG. 1.

In operation, when a main switch (not shown) of the apparatus is turned on, the contact glass plate 2 and the pressure plate 1 move in unison to the left as viewing into FIG. 1 until the right end of the contact glass plate 2 comes to be located immediately above the image exposing optical system 4, as shown in FIG. 2. When a print button (not shown) is depressed after placing a desired original on the contact glass plate 2, every unit of the apparatus is set in operation and the lamps 3 are lit. Under the condition, the right-hand light shield plate 2A takes the position as indicated in FIG. 2 so that the light emitted from the lamps 3 is prevented from going outside of the apparatus, and, at the same time, any foreign matter is prevented from being introduced into the interior of the apparatus through the gap between the contact glass plate 2 and the hopper 6.

Figure 3:
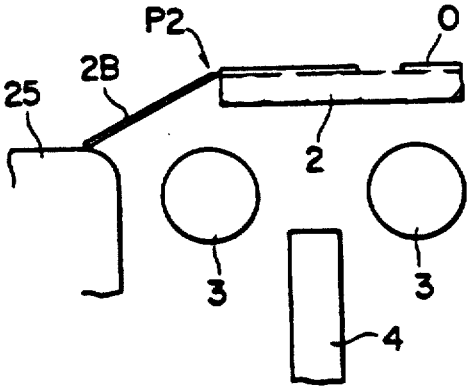

Upon stabilization of illumination by the lamps 3, the contact glass plate 2 with the original O thereon moves to the right in FIG. 1 so that the original O on the contact glass plate 2 is subjected to slit-exposure. When the contact glass plate 2 has reached the position indicated in FIG. 3, it temporarily comes to a halt and thereafter it again moves to the left until it reaches the position indicated in FIG. 2. When the contact glass plate 2 is in the position indicated in FIG. 2, the left-hand light shield plate 2B blocks the gap between the contact glass plate 2 and a top plate 25 of the apparatus so that light from the lamps 3 is prevented from being irradiated to the exterior and foreign matter is prevented from being introduced into the interior. When the main switch is turned off upon completion of reproduction operation, the contact glass plate 2 again moves to the right until it comes to the initial position shown in FIG. 1, and, thereafter, the main motor is turned off.

Returning to FIG. 1, when the print button is depressed as previously mentioned, the paper feed roller 16 is driven to rotate thereby causing the topmost sheet of transfer paper S to be discharged out of the cassette 17. However, the thus discharged sheet of transfer paper S is restrained from further advancement when its leading edge comes into abutment against the registration roller 15. Thus, the registration roller 15 keeps the sheet of transfer paper in a hold state. During this time, the photosensitive drum 10 is in rotation in the clockwise direction with the charging unit 5, developing roller 7, cleaning unit 11 and quenching unit 12 all held in operative condition. On the other hand, turning on of the main switch causes the fixing unit 22 to be operative; in other words, a heater provided inside of the upper roller is set operative. In this manner, the fixing unit 22 is set ready for operation in a short period of time.

As described previously, while the contact glass plate 2 having thereon the original O moves in a predetermined direction, the original O is slit-exposed from one end to the other so that an electrostatic latent image is formed on the peripheral surface of the drum 10. As the latent image is formed, it is immediately developed by the developing roller 7 into a visible toner image. The sheet of transfer paper S held in a stand-by condition by the registration roller 15 is transported to an image transfer station by the registration roller 15 in synchronism with the rotation of the drum 10 and the timing of slit-exposure of the original O, where the visible toner image formed on the drum 10 is transferred to the sheet of transfer paper S as it is transported through the image transfer station where the transfer corona unit 9 is disposed.

It is to be noted that the sheet of transfer paper S is brought into contact with the drum 10 in order to have the toner image transferred to the transfer paper S; however, since the drum 10 has a small diameter as mentioned previously, the transfer paper S becomes separated away from the peripheral surface of the drum 10 by its own stiffness as it is being advanced in the transporting direction, or to the left in FIG. 1, in association with the rotation of the drum 10.

As the transfer paper S advances after having been separated from the drum 10, the charge removing brush 18 comes into contact with the back surface of the transfer paper S thereby removing the charge on the transfer paper S. The transfer paper S, in turn, is transported into the image fixing unit 22, for example, by well known means such as transport rollers arranged along the transport path of transfer paper S, it is guided by the guide plates 21, where the toner image riding on the transfer paper S becomes fixed to the transfer paper S while it is passed through a pair of fixing rollers as pressed therebetween. Thereafter, the transfer paper S now having thereon a fixed toner image is further transported as guided by the additional guide plates 24 to be finally discharged out of the apparatus as driven by the paper discharging rollers 23. On the other hand, the peripheral surface of the drum 10 after image transfer is brought to a cleaning station, where residual toner particles are removed by the cleaning unit 11, which is followed by the light discharging step in which the peripheral surface of the drum 10 is subjected to a blanket exposure by the light from the quenching lamp 12 to eliminate any residual charges on the drum surface, thereby completing a reproduction process.

Figure 4:
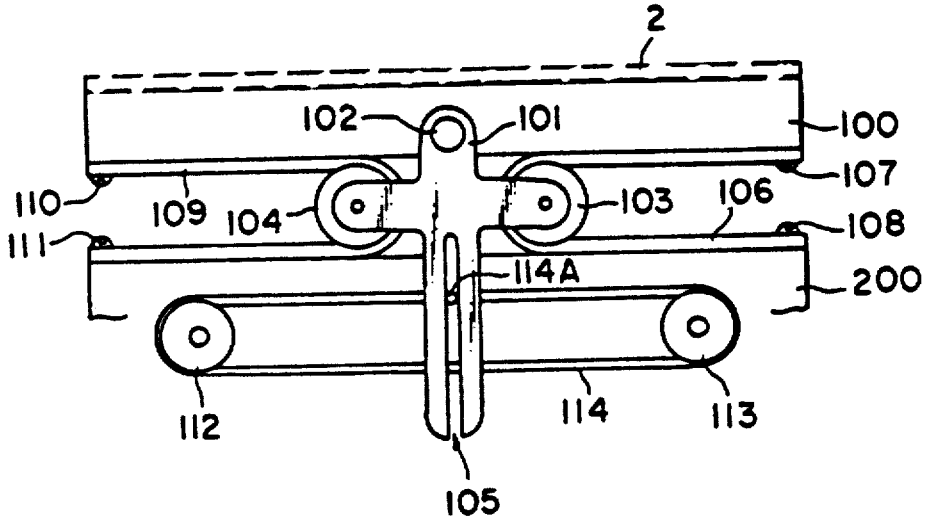
FIG. 4 is a schematic illustration showing the mechanism for driving to move the contact glass plate on which an original may be placed.

As described previously, the contact glass plate 2 executes a reciprocating motion in the horizontal direction in FIG. 1. FIG. 4 schematically shows the driving mechanism to carry out such a reciprocating motion of the contact glass plate 2. Briefly described with reference to FIG. 4, the contact glass plate 2 is supported on a support 100 to which is fixedly mounted a cross-shaped engaging member 101 by means of fixing means 102 of any well-known structure. Each of the pair of arms extending horizontally in the opposite direction from the vertical arm of the cross-shaped engaging member 101 rotatably supports a grooved roller 103 or 104 at its forward end. Also provided is a pair of belts 106 and 109 having a circular cross section and each having one end fixed to the contact glass plate 2 by means of fixing means 107 or 110 and the other end fixed to an immovable section 200 of the apparatus by means of fixing means 108 or 111. These belts 106, 109 are passed around the grooved rollers 103, 104, respectively. A pair of pulleys 112 and 113 is rotatably supported on the immovable section 200 of the apparatus and an endless belt 114 is extended between the pulleys 112 and 113. One of the pulleys 112 and 113 is driven to rotate by means of a driving source (not shown).

As shown in FIG. 4, the vertical arm of the engaging member 101 is provided with a slot 105, and an engaging pin 114A fixedly mounted on the endless belt 114 is in engagement with the slot 105. Thus, when the pulley 113 is driven to rotate in a predetermined direction, the contact glass plate 2 will execute a reciprocating motion.

Figure 5:
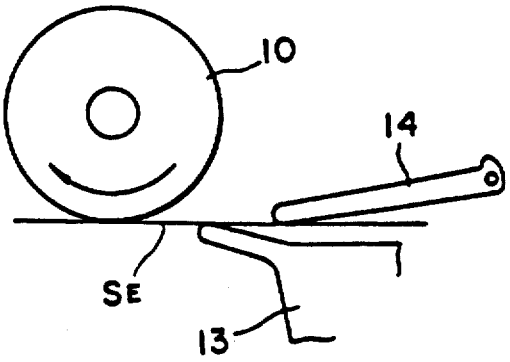
FIGS. 5 and 6 are schematic illustrations showing the paper guide structure forming part of the apparatus of FIG. 1.
Figure 6:
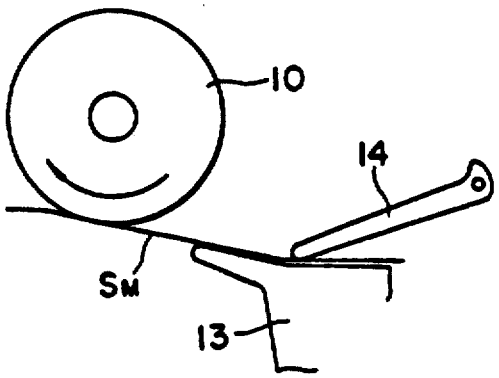

The transfer paper guide structure 13 has a forward portion which is inclined slightly upward toward the drum 10, as best shown in FIGS. 5 and 6. The pressure plate 14 is pivotally supported by a pivot axis 14A and it is made to be relatively light weight. The pressure plate 14 may pivot around the axis 14A freely under the influence of gravity force and thus its forward end rests on the top surface of the guide structure 13 if transfer paper is absent therebetween. As shown in FIG. 5, when a relatively thick or stiff transfer paper $S_E$ is transported, the pressure plate 14 does not appreciably bend the transfer paper $S_E$, however, when a relatively thin or less stiff transfer paper $S_M$ is transported as shown in FIG. 6, the transfer paper $S_M$ is significantly bent by the weight of the pressure plate 14 so that the transfer paper $S_M$ will advance as guided along the top surface of the inclined forward portion before entering into the image transfer station.

In this manner, due to cooperation between the guide structure 13 and the pressure plate 14, the incident angle of the transfer paper entering into the transfer station may be automatically adjusted depending on the thickness or stiffness of the paper, thereby *forming stiffness adjusting means and* allowing to eliminate irregularities in transfer characteristics, *such as transfer paper separation characteristics*, due to fluctuations in stiffness or flexibility of transfer paper used.

Figure 7:
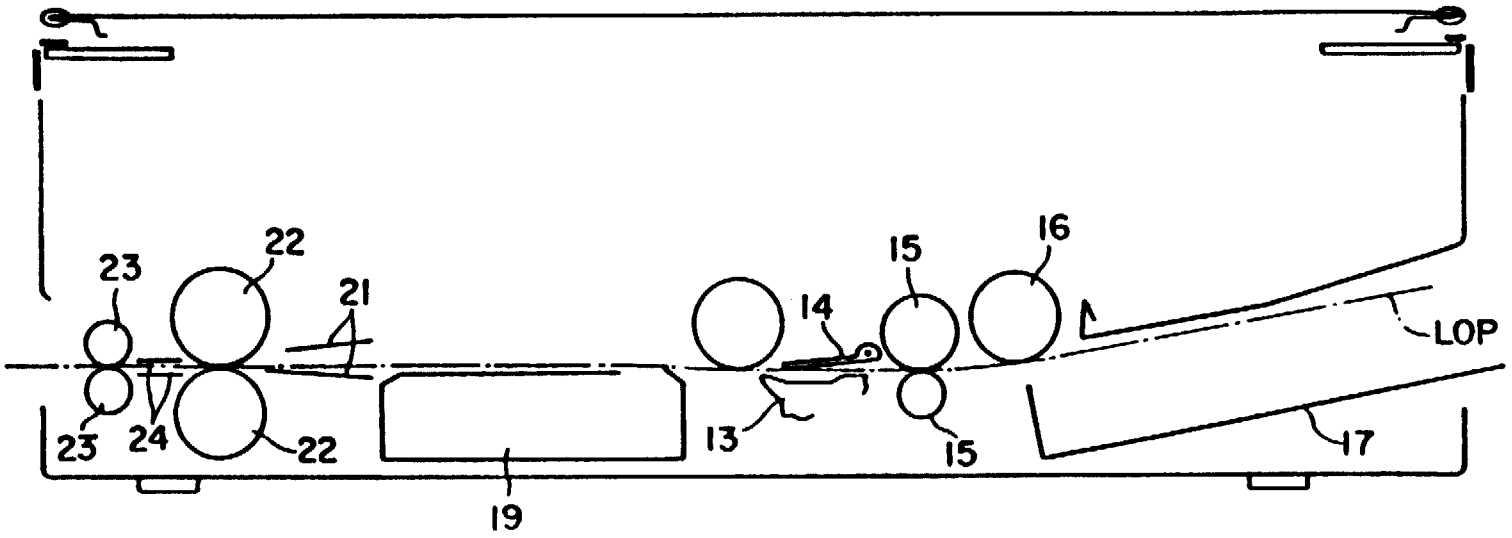
FIG. 7 is a schematic illustration useful for explaining easiness in maintenance of the apparatus shown in FIG. 1.

In FIG. 7, the one-dotted line LOP indicates the transportation path for transfer paper S inside the apparatus, and the present apparatus, or its housing is divided into upper and lower halves across this line LOP. Accordingly, the upper half of the apparatus may be lifted or pivoted upward with respect to the stationary lower half, thereby allowing to expose the transportation path and providing easy access not only to the path but also other interior parts of the apparatus. Such a structure is extremely advantageous from the viewpoint of maintenance. For example, if a sheet of transfer paper is jammed somewhere along the path, it is only necessary to move the upper half away from the lower half to have the path exposed without checking exactly where the jamming has occurred.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A recording apparatus comprising:

an endless image forming member driven to rotate in a predetermined direction to pass through a transfer station, *said endless image forming member being in the form of a drum having a diameter in the range between 10 mm and 40 mm;* image forming means for forming a[n] *toner* image on said endless image forming member, *said image forming means including an array of convergent light transmitting mediums for focusing an original light image onto said image forming member therethrough;* transporting means for transporting transfer mediums one by one through said transfer station where said *toner* image formed on said endless image forming member is transferred to the transfer medium which is brought into contact with said endless image forming member at said transfer station, said transporting means including [stiffness] adjusting means for *automatically* adjusting the *incident angle of said transfer-medium entering into said transfer station depending on a* stiffness of said transfer medium[s] which [are] *is* to be brought into contact with said image forming member at said transfer station so that a uniform separating characteristic is obtained irrespective of the degree of stiffness of said transfer medium[s before adjustment]; and

[said endless image forming member having a radius of curvature at said transfer station which is small enough for] *whereby* said transfer medium [to] separate*s* away from said endless image forming member by its own stiffness after passing through the transfer station.

2. Apparatus of claim 1 [wherein said endless image forming member is in the form of a drum having a diameter which is small enough for said transfer medium to separate away from said image forming member by its own stiffness after image transfer] *further comprising charger removing means disposed adjacent to and downstream of said transfer station with respect to a direction of advancement of said transfer medium transported by said transporting means for removing charge from said transfer medium at least partly after image transfer.*

[3. Apparatus of claim 2 wherein said diameter is in the range between 10 mm and 40 mm.]

[4. Apparatus of claim 1 wherein said image to be transferred from said image forming member to said transfer medium is an electrostatic latent image.]

[5. Apparatus of claim 1 wherein said image to be transferred from said image forming member to said transfer medium is a visible image which has already been developed.]

6. Apparatus of claim 1 wherein said [stiffness] adjusting means includes a guide structure having an upwardly inclined forward portion directed toward said image forming member, the top surface of said guide structure defining a part of the path for transporting said transfer [mediums] *medium*, and a pivotally supported pressure plate having a forward end which can rest on said top surface.

7. Apparatus of claim 6 wherein the weight of said pressure plate is so determined that a relatively stiff transfer medium is not appreciably bent and thus is not appreciably brought into contact with said top surface while being transported, but a relatively less stiff transfer medium is appreciably bent by said pressure plate and thus is appreciably brought into contact with said top surface while being transported.

*8. A recording apparatus comprising:*

*a drum-shaped image forming member driven to rotate in a predetermined direction to pass through a transfer station;*

*image forming means disposed around said drum-shaped image forming member for forming a toner image on said image forming member, said image forming means including an array of convergent light transmitting mediums for focusing an original light image onto said image forming member to form an electrostatic latent image on said image forming member and a developing means for developing said latent image into said toner image, said developing means including a developing roller having a diameter smaller than a diameter of said image forming member and positioned for applying a toner to said image forming member;*

*transporting means for transporting transfer mediums one by one through said transfer station where said toner image formed on said image forming member is transferred to the transfer medium which is brought into contact with said image forming member at said transfer station, wherein said transporting means includes adjusting means for automatically adjusting the incident angle of said transfer medium entering into said transfer station depending on a stiffness of said transfer medium which is to be brought into contact with said image forming member at said transfer station, thereby allowing a uniform separating characteristic to be obtained irrespective of the degree of stiffness of said transfer medium; and*

*non-corona discharging type charge removing means disposed adjacent to and downstream of said transfer station with respect to a direction of advancement of said transfer medium transported by said transporting means for removing charge from said transfer medium at least partly;*

*whereby said image forming member is less than or equal to 40 mm, thereby allowing the transfer medium to separate away from said image forming member by its own stiffness after passing through the transfer station.*

*9. Apparatus of claim 8, wherein said image forming means includes charging means for uniformly charging said image forming member, exposing means including said array of convergent light transmitting means for exposing said image forming member thus uniformly charged to an original light image to form said electrostatic latent image on said image forming member, said developing means for developing said electrostatic latent image on said image forming member to form said toner image thereon, and transferring means for transferring said toner image to a transfer medium transported by said transporting means.*

*10. Apparatus of claim 9, wherein said image forming member is driven to rotate in a predetermined direction at constant speed and said charging means, exposing means, developing means, and transferring means are disposed around said image forming means in said predetermined direction in the order mentioned.*

*11. Apparatus of claim 9, wherein said transferring means includes an image transferring corona discharging device for applying corona ions of a predetermined polarity to the back side of said transfer medium.*

*12. Apparatus of claim 8, wherein said adjusting means includes a guide structure having an upwardly inclined forward portion directed towards said image forming member, the top surface of said guide structure defining a part of the path for transporting said transfer medium, and a pivotally supported pressure plate having a forward end which may rest on said top surface.*

*13. Apparatus of claim 12, wherein the weight of said pressure plate is so determined that a relatively stiff transfer medium is not appreciably bent and thus is not appreciably brought into contact with said top surface while being transported, but a relatively less stiff transfer medium is appreciably bent by said pressure plate and thus is appreciably brought into contact with said top surface while being transported.*

*14. Apparatus of claim 8, further comprising holding means for holding an original above said image forming member, and wherein said array of convergent light transmitting mediums is disposed between said holding means and said image forming member and above said image forming member.*

*15. Apparatus of claim 14, wherein said holding means includes a contact glass plate for placing thereon an original.*

*16. Apparatus of claim 15, wherein said contact glass plate is movable horizontally back and forth.*

*17. Apparatus of claim 8 wherein said non-corona discharging type charge removing means comprises a discharging brush.*

*18. A recording apparatus comprising:*

*an endless image forming member driven to rotate in a predetermined direction to pass through a transfer station;*

*image forming means for forming an image on said endless image forming member;*

*transporting means for transporting transfer mediums one by one through said transfer station where said image formed on said endless image forming member is transferred to the transfer medium which is brought into contact with said endless image forming member at said transfer station, said transporting means including adjusting means for automatically adjusting the incident angle of said transfer medium entering into said transfer station depending on a stiffness of said transfer medium which is to be brought into contact with said image forming member at said transfer station so that a uniform separating characteristic is obtained irrespective of the degree of stiffness of said transfer medium; and*

*said endless image forming member having a radius of curvature at said transfer station which is small enough for said transfer medium to separate away from said endless image forming member by its own stiffness after passing through said transfer station.*

*19. Apparatus of claim 18 wherein said endless image forming member is in the form of a drum having a diameter which is small enough for said transfer medium to*

*separate away from said image forming member by its own stiffness after image transfer.*

*20. Apparatus of claim 19 wherein said diameter is in the range between 10 mm and 40 mm.*

*21. Apparatus of claim 18 wherein said image to be transferred from said image forming member to said transfer medium is a visible image which has already been developed.*

*22. Apparatus of claim 18 wherein said adjusting means includes a guide structure having an upwardly inclined forward portion directed toward said image forming member, the top surface of said guide structure defining a part of the path for transporting said transfer medium, and a pivotally supported pressure plate having a forward end which can rest on said top surface.*

*23. Apparatus of claim 22 wherein the weight of said pressure plate is so determined that a relatively stiff transfer medium is not appreciably bent and thus is not appreciably brought into contact with said top surface while being transported, but a relatively less stiff transfer medium is appreciably bent by said pressure plate and thus is appreciably brought into contact with said top surface while being transported.*

* * * * *